US009197444B2

(12) United States Patent
Yang et al.

(10) Patent No.: US 9,197,444 B2
(45) Date of Patent: Nov. 24, 2015

(54) MULTIPLE-INTERFACE NETWORK DEVICE AND SELECTION METHOD FOR TRANSMITTING NETWORK PACKETS

(71) Applicants: Industrial Technology Research Institute, Hsinchu (TW); National Chiao Tung University, Hsinchu (TW)

(72) Inventors: Shun-Neng Yang, Taichung (TW); Chai-Hien Gan, Hsinchu (TW); Yung-Chun Lin, Hsinchu County (TW); Yi-Bing Lin, Hsinchu County (TW)

(73) Assignees: Industrial Technology Research Institute, Hsinchu (TW); National Chiao Tung University, Hsinchu (TW)

( * ) Notice: Subject to any disclaimer, the term of this patent is extended or adjusted under 35 U.S.C. 154(b) by 178 days.

(21) Appl. No.: 14/142,900

(22) Filed: Dec. 29, 2013

(65) Prior Publication Data

US 2015/0146523 A1 May 28, 2015

(30) Foreign Application Priority Data

Nov. 22, 2013 (TW) .............................. 102142668 A

(51) Int. Cl.
*H04W 4/00* (2009.01)
*H04L 12/54* (2013.01)
(Continued)

(52) U.S. Cl.
CPC .......... *H04L 12/5692* (2013.01); *H04L 45/306* (2013.01); *H04L 45/38* (2013.01); *H04W 28/02* (2013.01); *H04W 28/0205* (2013.01); *H04W 28/0247* (2013.01); *H04W 28/0268* (2013.01)

(58) Field of Classification Search
CPC ............ H04W 28/02; H04W 28/0205; H04W 28/0247; H04W 28/0268
USPC ................................. 370/230, 235
See application file for complete search history.

(56) References Cited

U.S. PATENT DOCUMENTS

| 6,917,589 B2 | 7/2005 | Berenbaum |
| 6,947,750 B2 | 9/2005 | Kakani et al. |

(Continued)

FOREIGN PATENT DOCUMENTS

| CN | 102684951 A | 9/2012 |
| CN | 103179642 | 6/2013 |

(Continued)

OTHER PUBLICATIONS

Eric Bouillet, et al., "Design Assisted, Real Time, Measurement-Based Network Controls for Management of Service Level Agreements," Proceedings of EURANDOM Workshop on Stochastics of Integrated-Services Comm. Networks, Nov. 15, 1999, pp. 1-10.

(Continued)

*Primary Examiner* — Farah Faroul
(74) *Attorney, Agent, or Firm* — Jianq Chyun IP Office

(57) ABSTRACT

A selection method for transmitting network packets adapted to be executed by a multiple-interface network device is provided. The multiple-interface network device includes a plurality of network interfaces. Each of the network interfaces connects to one of multiple communication networks. The selection method includes the following steps: collecting a transmission status of each of the communication networks; analyzing transmission characteristics of a predetermined number of packets of a service flow to determine a traffic pattern type of the service flow; comparing the transmission status of each of the communication networks with the transmission requirements of the traffic pattern type of the service flow to select one of the network interfaces, and using the selected network interface to transmit packets of the service flow. The service flow is constituted by packets transmitted by the network interfaces through a port and packets received by the network interfaces through the same port.

20 Claims, 4 Drawing Sheets

(51) Int. Cl.
*H04L 12/725* (2013.01)
*H04L 12/721* (2013.01)
*H04W 28/02* (2009.01)

(56) References Cited

U.S. PATENT DOCUMENTS

| | | | |
|---|---|---|---|
| 7,245,913 | B1 | 7/2007 | Nguyen et al. |
| 2004/0193892 | A1* | 9/2004 | Tamura ............... H04L 63/1458 713/182 |
| 2011/0019556 | A1 | 1/2011 | Hsin et al. |
| 2011/0242979 | A1* | 10/2011 | Feroz ...................... H04L 47/17 370/235 |
| 2012/0131222 | A1* | 5/2012 | Curtis ................. H04L 47/2441 709/235 |
| 2013/0039183 | A1 | 2/2013 | Nooren et al. |
| 2014/0029570 | A1* | 1/2014 | Lee ................... H04W 36/0005 370/331 |
| 2014/0181290 | A1* | 6/2014 | Wong ...................... H04L 63/10 709/224 |
| 2015/0085657 | A1* | 3/2015 | Hoehne ................ H04W 40/12 370/235 |

FOREIGN PATENT DOCUMENTS

| | | |
|---|---|---|
| TW | I277351 | 3/2007 |
| TW | 201238289 | 9/2012 |
| TW | 201313052 | 3/2013 |

OTHER PUBLICATIONS

Eui-Jik Kim, et al., "Power-Controlled Topology Optimization and Channel Assignment for Hybrid MAC in Wireless Sensor Networks," IEICE Trans. Commun., vol. E94-B, No. 9, Sep. 2011, pp. 2461-2472.

Thomas Fuhrmann, et al., "Pushing Chord into the Underlay: Scalable Routing for Hybrid MANETs," Universitat Karlsruhe, Fakultat fur Informatik, Jun. 21, 2006, pp. 1-15.

Franca Delmastro, et al., "P2P multicast for pervasive ad hoc networks," Pervasive and Mobile Computing, Apr. 4, 2007, pp. 62-91.

Son Hong Ngo, et al., "An Ant-based Approach for Dynamic RWA in Optical WDM Networks," Photonic Network Communications, Jan. 2006, pp. 1-16.

Fariza Sabrina, et al., "A Novel Architecture for Resource Management in Active Networks Using a Directory Service," 10th International Conference on Telecommunications, Feb. 23-Mar. 1, 2003, pp. 1-7.

* cited by examiner

MULTIPLE-INTERFACE NETWORK DEVICE AND SELECTION METHOD FOR TRANSMITTING NETWORK PACKETS

CROSS-REFERENCE TO RELATED APPLICATION

This application claims the priority benefit of Taiwan application serial no. 102142668, filed on Nov. 22, 2013. The entirety of the above-mentioned patent application is hereby incorporated by reference herein and made a part of this specification.

BACKGROUND

1. Technical Field

The disclosure relates to a multiple-interface network device, and more particularly, to a selection method for transmitting network packets for a multiple-interface network device.

2. Description of Related Art

At present, many electronic devices with network access capability support multiple network interfaces. For instance, Wi-Fi network and Long Term Evolution (LTE) network are supported by most smart phones. These electronic devices generally provide various services through applications, thus data for multiple application services are usually transmitted at the same time. The electronic devices currently use only a single network for data transmission, respectively.

SUMMARY

The disclosure is directed to a multiple-interface network device and a selection method for transmitting network packets, capable of performing a service flow separation according to different characteristics of each application service, so as to fully utilize multiple networks while satisfying requirements for quality of service (QoS) as much as possible.

A multiple-interface network device of the disclosure includes a processor and a plurality of network interfaces. Each of the network interfaces connects to one of a plurality of communication networks. The processor is coupled to the network interfaces, and configured for collecting a transmission status of each of the communication networks, analyzing transmission characteristics of a predetermined number of packets of a service flow to determine a traffic pattern type of the service flow, comparing the transmission status of each of the communication networks with the transmission requirements of the traffic pattern type of the service flow to select one of the network interfaces, and using the selected network interface to transmit packets of the service flow. The service flow is constituted by packets transmitted by the network interfaces through a port and packets received by the network interfaces through the same port.

A selection method for transmitting network packets of the disclosure may be executed by above-said multiple-interface network device, and the method includes the following step: collecting a transmission status of each of the communication networks; analyzing transmission characteristics of a predetermined number of packets of a service flow to determine a traffic pattern type of the service flow; comparing the transmission status of each of the communication networks with the transmission requirements of the traffic pattern type of the service flow to select one of the network interfaces, and using the selected network interface to transmit packets of the service flow.

Based on above, the multiple-interface network device and the selection method for transmitting network packets may classify the service flows according to the transmission characteristics. For instance, different applications may include different service flows, so as to pair each service flow with a suitable network interface.

To make the present disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
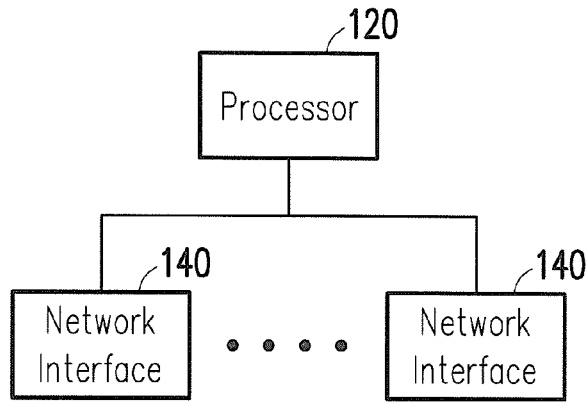
FIG. 1 is a schematic diagram of a multiple-interface network device according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram of a multiple-interface network device 100 according to an embodiment of the disclosure. The multiple-interface network device 100 may be any electronic device with network access capability, such as a smart phone, a personal digital assistant (PDA), a tablet PC, a notebook PC or a desktop PC. The multiple-interface network device 100 includes a processor 120 and a plurality of network interfaces 140. The processor 120 may include one single processor, or a plurality of processors in which each of the processors may include one single processing core or a plurality of processing core. Although FIG. 1 illustrates two network interfaces, the multiple-interface network device 100 of the present embodiment may include more network interfaces 140 if required. The processor 120 is coupled to each of the network interfaces 140. Each of the network interfaces 140 is connected to one of different communication networks, such as Wi-Fi network, LTE network, Ethernet or other similar wired or wireless networks.

Figure 2:
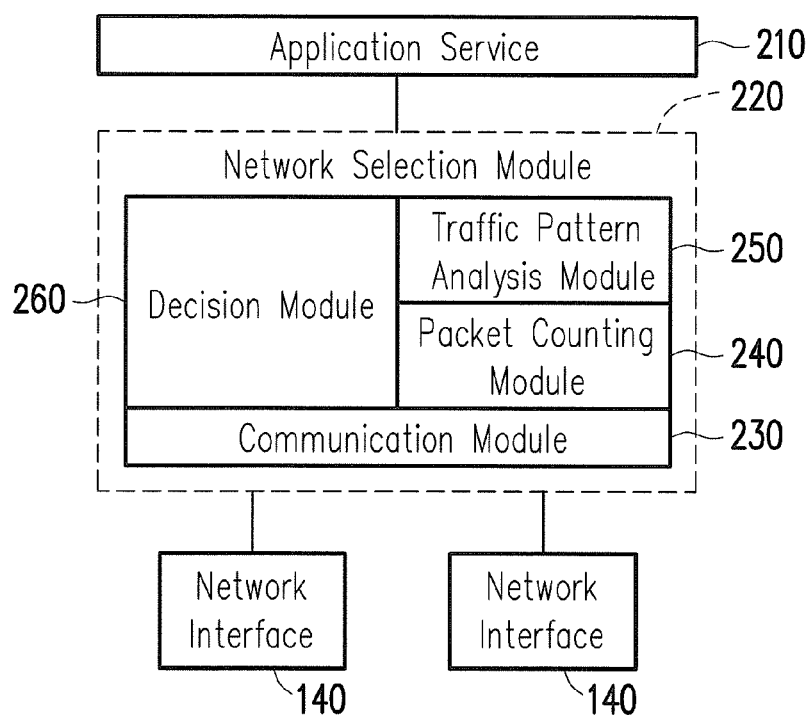
FIG. 2 is a system configuration diagram of the multiple-interface network device according to an embodiment.

FIG. 2 is a system configuration diagram of the multiple-interface network device 100 according to an embodiment of the disclosure. The processor 120 is capable of executing one or more applications to provide one or more application services 210, and the application services 210 may access the communication networks through the network interfaces 140. The processor 120 may execute a network selection module 220. The network selection module 220 is configured between the application services 210 and the network interfaces 140, and including a communication module 230, a packet counting module 240, a traffic pattern analysis module 250, and a decision module 260. The communication module 230 may interact with each of the network interfaces 140 to transmit or receive packets for the application services 210. The network selection module 220 may execute a selection method for transmitting network packets depicted in FIG. 3 and FIG. 4.

Figure 3:
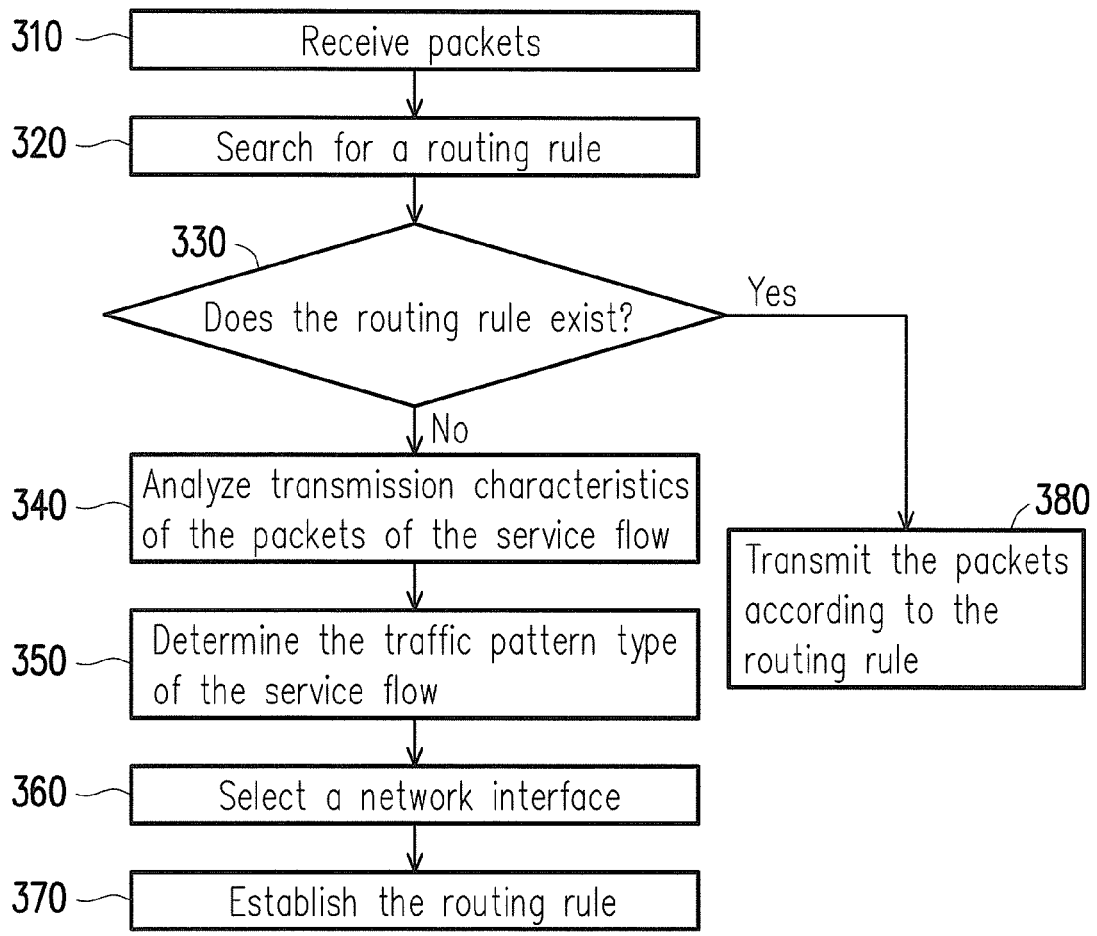
FIG. 3 and FIG. 4 are flowcharts illustrating a selection method for transmitting network packets according to an embodiment.

FIG. 3 is a flowchart illustrating a selection method for transmitting network packets according to an embodiment of the present disclosure. When the application service 210 intends to transmit packets, the communication module 230 may receive the packets (step 310). Next, the communication module 230 may use a source port of the packets as an index, and searches for a routing rule matching the index in a routing rule table (step 320), and check whether the routing rule matching the index exists (step 330).

Table 1 below is an example of the routing rule table according to the present embodiment. Table 1 at least includes two fields in which a first field is the source port of the packets as the index, and a second field is the routing rule of the packet. The routing rule may be record in form of code numbers or names of the network interfaces in the routing rule table.

TABLE 1 example of the routing rule table

| Source port | Routing rule |
|---|---|
| 12334 | LTE |
| 55678 | Wi-Fi |

If the routing rule matching the index is in the routing rule table, the communication module 230 transmits the packets according to the routing rule (step 380). In the routing table, each routing rule corresponds to one port as the index, and specifies using one network interface among the network interfaces 140 to transmit all the packets of the port according to the routing rule matching the source port as the index. Accordingly, the communication module 230 may transmit the packets by using the network interface 140 specified by the routing rule matching the index.

If the routing rule matching the index is not in the routing rule table, the communication module 230 determines that the packets belong to a new service flow. The application service 210 may transmit or receive the packets through multiple ports at the same time. In this case, the packets belong to a plurality of different service flows. The present embodiment divides the service flows according to the ports at the multiple-interface network device 100. One service flow is constituted by packets transmitted by the network interfaces 140 through a port and packets received by the network interfaces 140 through the same port. In other words, each port of the multiple-interface network device 100 is corresponding to one of the different service flows.

When the communication module 230 discovers that the routing rule is not in the routing rule table in step 330, the network selection modules 220 may execute steps 340 to 370 for the new service flow. It may take a while to determine the packets of this service flow are to be transmitted by which of the network interfaces in steps 340 to 370. Before then, the communication module 230 may select one of the network interfaces 140 according to a preset rule to transmit the packets of this service flow.

The packet counting module 240 records and analyzes transmission characteristics of a predetermined number of packets of this service flow (step 340). The transmission characteristics may include a size, a timestamp and a transmission direction of each of the packets, and the transmission direction may be transmitting or receiving. The transmission characteristics may be provided by the communication module 230, and details thereof will be described later. The traffic pattern analysis module 250 determines a traffic pattern type of the service flow according to analysis of the packet counting module 240 (step 350).

For instance, three traffic pattern types may be set. A first traffic pattern type may be a periodical traffic pattern characterized in that the sizes of the packets are varied, a periodical bidirectional transmission is provided, and a network having guaranteed bit rate (GBR) is required. For instance, the periodical traffic pattern includes the application services such as voice over IP (Internet Protocol), video over IP, and live streaming.

A second traffic pattern type is a bursting traffic pattern characterized in that, the packets are larger, a packet transmission is dense, a unidirectional transmission is usually provided, and a network having high bandwidth is required. For instance, the bursting traffic pattern includes the application services such as buffered streaming, File Transfer Protocol (FTP), and P2P.

A third traffic pattern type is a request/response traffic pattern characterized in that, a bidirectional packet transmission is provided, sizes and periods of the packets are not fixed, and a network having less end-to-end delay is required. For instance, the request/response traffic pattern includes the application services such as web browsing, interactive chat, interactive game, and control signaling.

At usual times, the communication module 230 may collect the transmission status of each communication network connected to the network interface 140, and the so-called transmission status includes at least one of an available bandwidth, an end-to-end delay, an end-to-end delay jitter, a packet loss rate, and a packet error rate of the communication network. The end-to-end delay may be a round trip time of the packets between two multiple-interface network devices, or other similar delay times. For each of the communication networks, the communication network 230 may compute the transmission status of the communication network, or obtain the transmission status of the communication network from an access point (AP) or a base station of the communication network.

Subsequently, the decision module 260 may compare the transmission status of each of the communication networks with the transmission requirements of the traffic pattern type of the service flow, and select the communication network having the transmission status best matching the transmission requirement of the service flow from among the communication networks to transmit packets of the service flow (step 360). For instance, the service flow of the periodical traffic pattern requires the network having guaranteed bit rate, thus the decision module 260 may select the communication network having the available bandwidth greater than a preset threshold to transmit the packets of the service flow. The service flow of the bursting traffic pattern requires the network having high bandwidth, thus the decision module 260 may select the communication network having the available bandwidth being the greatest to transmit the packets of the service flow. The service flow of the request/response traffic pattern requires the network having less end-to-end delay, thus the decision module 260 may select the communication network having the lowest end-to-end delay to transmit the packets of the service flow.

The decision module 260 may establish a new routing rule in the routing rule table for the service flow (step 370). The routing rule uses the source port of the packets in step 310 as the index, and specifies using the network interface selected in step 360 to transmit all of the packets of the service flow matching the index. When next time the communication module 230 receives packets of the same service flow in step 310, the packets may be transmitted according to the routing rule in step 380.

For each service flow, the network selection module 220 may periodically re-determine the traffic pattern type of the service flow, and re-select one of the network interfaces for the new service flow according to the transmission status of each of the communication networks and the traffic pattern type of the new service flow, thereby updating the routing rule of the service flow. Accordingly, the routing rule of each service flow may be dynamically adjusted according to the latest transmission status of the communication network.

Figure 4:
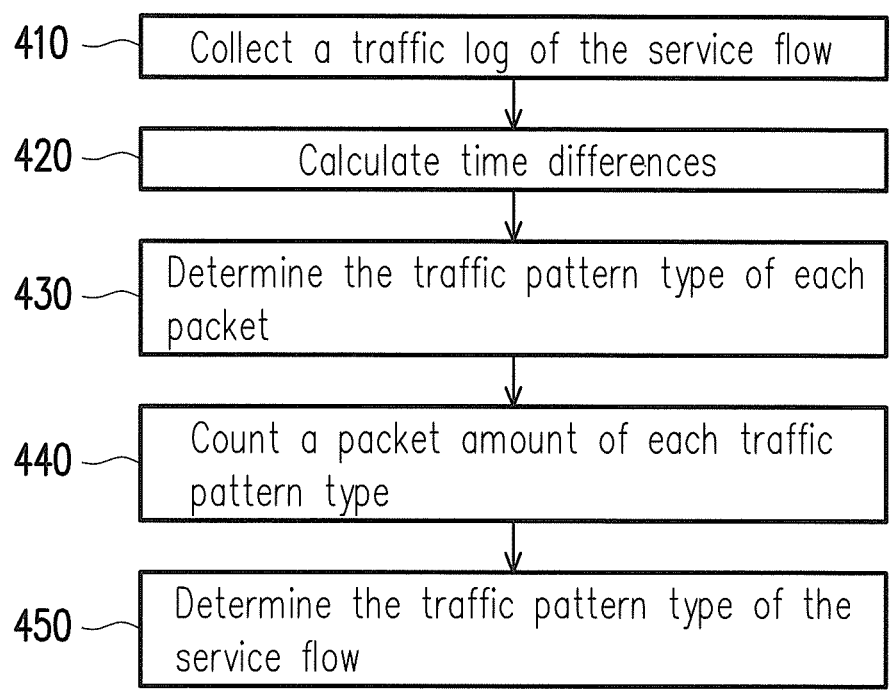

FIG. 4 illustrates further details of steps 340 and 350 of the selection method for transmitting network packets depicted in FIG. 3. The packet counting module 240 may collect the transmission characteristics of the predetermined number of packets of the service flow to be used as a traffic log of the service flow (step 410). The transmission characteristics may include a size, a timestamp and a transmission direction of each of the packets in the traffic log, and the transmission direction may be transmitting or receiving.

The packet counting module 240 may calculate three time differences (i.e., a transmission interval, a reception interval, and a pair interval) according to the transmission direction and the timestamp of each of the packets (step 420). The packet counting module 240 calculates the transmission interval only for the packets whose transmission direction is "transmitting". The transmission interval refers to the time difference between the timestamp of the packet whose transmission direction is "transmitting" and the timestamp of the previous packet whose transmission direction is "transmitting". The packet counting module 240 calculates the reception interval only for the packets whose transmission direction is "receiving". The reception interval refers to the time difference between the timestamp of the packet whose transmission direction is "receiving" and the timestamp of the previous packet whose transmission direction is "receiving". The packet counting module 240 calculates the pair interval for each of the packets in the traffic log. The pair interval refers to the time difference between the timestamp of the packet and the timestamp of the previous packet with a different transmission direction.

The traffic pattern analysis module 250 may determine the traffic pattern type of each of the packets according to the transmission direction, the size and the three time differences of each of packets in the traffic log (step 430). One packet may belong to one or more traffic pattern types among a plurality of preset traffic pattern types. For instance, the traffic pattern analysis module 250 may determine the traffic pattern type that each of the packets in the traffic log belongs to according to Table 2 below. In Table 2, a first field "transmission size" refers to a size range of the packet having the transmission direction being "transmitting". A second field "reception size" refers to a size range of the packet having the transmission direction being "receiving". A unit "B" refers to one byte. A unit "ms" refers to one millisecond. "—" indicates that this field is less important so it can be any values. Table 2 may be obtained through previous experiments or statistics, in which the bursting traffic pattern may be further divided into uplink and downlink, and the periodical traffic pattern may be further divided into voice and video. The traffic pattern analysis module 250 may compare the transmission characteristics of each of the packets with values in each row of Table 2. Once one packet matches a value range of each column in one specific row, it is indicates that the packet belongs to the traffic pattern type of that row. Accordingly, one packet may belong to one or more traffic pattern types.

TABLE 2 a lookup list of traffic pattern types

| Transmission size | Reception size | Transmission interval | Reception interval | Pair interval | Traffic pattern type |
|---|---|---|---|---|---|
| 1000 to 1514 B | — | 0.01 to 0.1 ms | — | — | Bursting (uplink) |
| — | 1000 to 1514 B | — | 0.02 to 0.04 ms | — | Bursting (downlink) |
| 45 to 400 B | 45 to 400 B | 15 to 25 ms | 15 to 25 ms | — | Periodical (voice) |
| 600 to 1500 B | 600 to 1500 B | 55 to 65 ms | 55 to 65 ms | — | Periodical (video) |
| 54 to 1514 B | 54 to 1514 B | — | — | 0 to 100 ms | Request/response |

Nevertheless, Table 2 is an example and not intended to limit the scope of the disclosure. In another embodiment, the traffic pattern types of Table 2 may be set to arbitrary number based on actual demands, and the value range of each column may also be set to arbitrary range based on actual demands.

The traffic pattern analysis module 250 may cumulatively count a packet amount of each of the traffic pattern types (step 440), thereby determining the traffic pattern type of the service flow (step 450). For instance, a preset value greater than 50% (e.g., 70%, 80% or 90%) may be set. If a proportion of the packet amount of a specific traffic pattern type is greater than or equal to the preset value, the traffic pattern type of the service flow may be set to the specific traffic pattern type. If the proportion of the packet amount of each of the traffic pattern types is less than the preset value, the traffic pattern type of the service flow may be set to a preset traffic pattern type among the traffic pattern types. For instance, it is assumed that the preset value is 90%, and the preset traffic pattern type is the bursting traffic pattern. If the proportion of the packet amount belonging to the periodical traffic pattern in the traffic log reaches 90%, the service flow belongs to the periodical traffic pattern. If the proportion of the packet amount of each traffic pattern in the traffic log is less than 90%, the service flow belongs to the bursting traffic pattern.

In step 450 of another embodiment, the preset value being less than or equal to 50% (e.g., 40%) may be set. Further, each of the traffic pattern types in the traffic pattern type lookup list may include different priorities. For instance, the traffic pattern type appeared in higher place in the lookup list may have a higher priority. If the proportion of the packet amount of the specific traffic pattern type is greater than or equal to the preset value, it is determined that the service flow belongs to the specific traffic pattern type. Because the service flow may belong to more than two traffic pattern types, the traffic pattern type of the service flow may be set to the traffic pattern type with the higher priority among the traffic pattern types to which the service floe may belong to.

Figure 5:
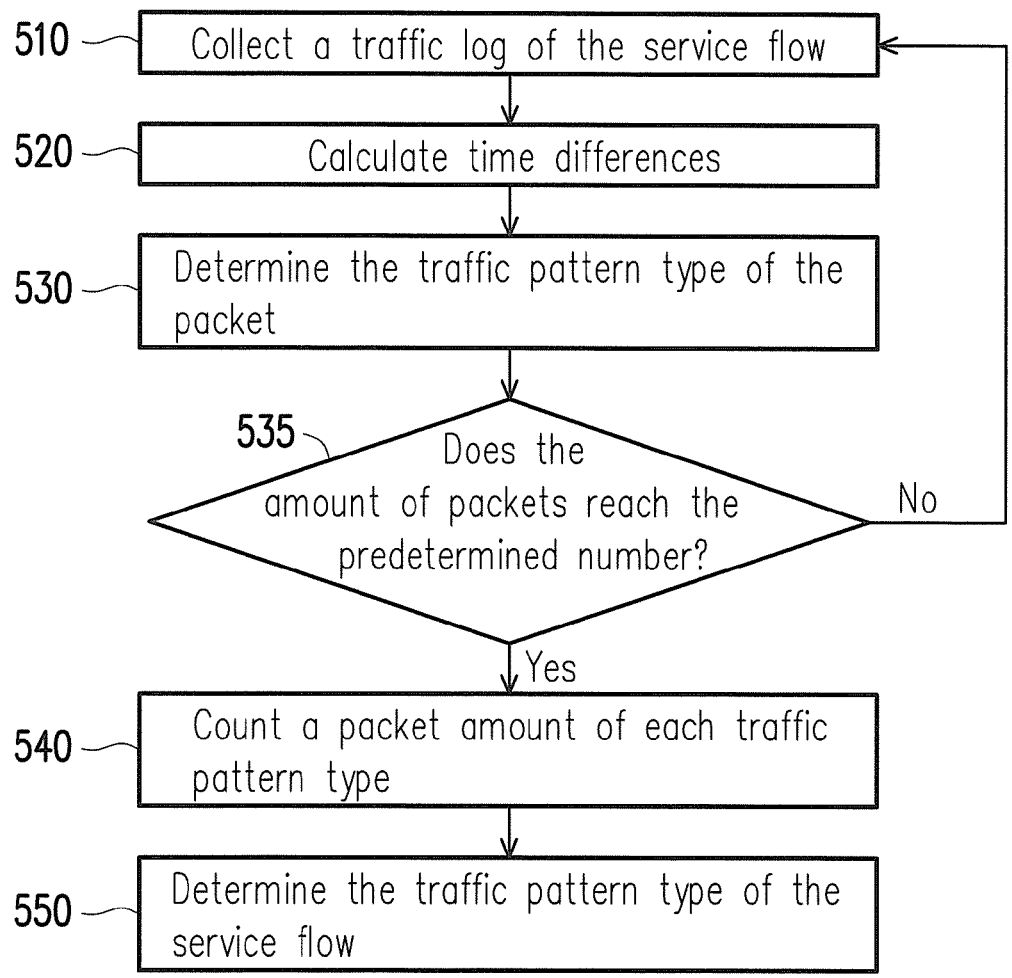
FIG. 5 is a flowchart illustrating a selection method for transmitting network packets according to another embodiment.

FIG. 5 illustrates further details of steps 340 and 350 of the selection method for transmitting network packets depicted in FIG. 3 according to another embodiment of disclosure. The method of FIG. 5 is similar to that of FIG. 4, a difference between the two is that, a number of packets are processed each time in the method of FIG. 4, and only one packet is processed each time in the method of FIG. 5. The method of FIG. 5 is suitable for the multiple-interface network device having a smaller memory.

Steps 510, 520 and 530 are similar to steps 410, 420 and 430 of FIG. 4, respectively. However, only one packet is collected or processed each time in steps 510, 520 and 530. Subsequently, check whether the amount of packets collected in steps 510 to 530 reaches a predetermined number or not (step 535). If the predetermined number is not yet reached, return back to step 510 to continue collecting the traffic log for the next packet. If the predetermined number is reached, proceed to step 540. Steps 540 and 550 are identical to steps 440 and 450, respectively, thus descriptions thereof are omitted hereinafter.

The multiple-interface network device and the selection method for transmitting network packets according to foregoing embodiments are capable of collecting the transmission status of the communication network and the transmission characteristics of the packets of the service flow for pairing each service flow with the suitable network interface. Accordingly, each service flow may transmit the packets through the most appropriate network interface, and the packets of multiple service flows may be transmitted at the same time by using multiple network interfaces, so as to fully utilize multiple network interfaces. The transmission characteristics may be easily obtained without going through complex deep packet inspection (DPI) to select the most appropriate network interface. Therefore, said multiple-interface network device and the selection method for transmitting network packets may provide high efficiency in satisfying requirements of quality of service in guaranteed bit rate, thereby improving user experiences.

Although the present disclosure has been described with reference to the above embodiments, it is apparent to one of the ordinary skill in the art that modifications to the described embodiments may be made without departing from the spirit of the present disclosure. Accordingly, the scope of the present disclosure will be defined by the attached claims not by the above detailed descriptions.

What is claimed is:

1. A multiple-interface network device, comprising:
a plurality of network interfaces, each of the network interfaces connecting to one of a plurality of communication networks; and
a processor coupled to the network interfaces, collecting a transmission status of each of the communication networks, analyzing transmission characteristics of a predetermined number of packets of a service flow to determine a traffic pattern type of the service flow, and comparing the transmission status of each of the communication networks with transmission requirements of the traffic pattern type of the service flow to select one of the network interfaces, and using the selected network interface to transmit packets of the service flow, wherein the service flow is constituted by packets transmitted by the network interfaces through a port and packets received by the network interfaces through the port.

2. The multiple-interface network device of claim 1, wherein the transmission status of each said communication network comprises at least one of an available bandwidth, an end-to-end delay, an end-to-end delay jitter, a packet loss rate, and a packet error rate of the communication network.

3. The multiple-interface network device of claim 1, wherein for each of the communication networks, the processor computes the transmission status of the communication network, or obtains the transmission status of the communication network from an access point or a base station of the communication network.

4. The multiple-interface network device of claim 1, wherein the transmission characteristics comprise a size, a timestamp and a transmission direction of the corresponding packet, and the transmission direction including transmitting or receiving.

5. The multiple-interface network device of claim 4, wherein the processor calculates a plurality of time differences according to the transmission direction and the timestamp of each of the predetermined number of packets, and determines the traffic pattern type of the service flow according to the transmission direction, the size, and the time differences of each of the predetermined number of packets.

6. The multiple-interface network device of claim 1, wherein according to the transmission characteristics of each packet among the predetermined number of packets, the processor relates the packet to at least one traffic pattern type among a plurality of traffic pattern types, and determines the traffic pattern type of the service flow according to a packet amount of each of the plurality of traffic pattern types.

7. The multiple-interface network device of claim 6, wherein if a proportion of the packet amount of a specific traffic pattern type among the plurality of traffic pattern types is greater than or equal to a preset value, the processor sets the traffic pattern type of the service flow to the specific traffic pattern type; and if the proportion of the packet amount of each of the plurality of traffic pattern types is less than the preset value, the processor sets the traffic pattern type of the service flow to a preset traffic pattern type among the plurality of traffic pattern types.

8. The multiple-interface network device of claim 1, wherein when a packet is to be transmitted by the processor, the processor uses a source port of the packet as an index, and searches for a routing rule matching the index in a routing rule table; and if the routing rule is in the routing rule table, the processor transmits the packet according to the routing rule, wherein the routing rule specifies using one of the network interfaces to transmit the packet.

9. The multiple-interface network device of claim 8, wherein if the routing rule is not in the routing rule table, the processor determines that the packet belongs to a new service flow, selects one of the network interfaces according to the transmission status of each of the communication networks and the traffic pattern type of the new service flow, establishes the routing rule matching the index for the new service flow, and transmits packets of the new service flow according to the routing rule, wherein the routing rule specifies using the network interface selected by the processor for the new service flow to transmit packets of the new service flow.

10. The multiple-interface network device of claim 9, wherein the processor periodically re-determines the traffic pattern type of the new service flow, and selects one of the network interfaces according to the transmission status of each of the communication networks and the traffic pattern type of the new service flow, thereby updating the routing rule.

11. A selection method for transmitting network packets, executed by a multiple-interface network device, the multiple-interface network device comprising a plurality of network interfaces, and each of the network interfaces connecting to one of a plurality of communication networks, and the selection method for transmitting network packets comprising:

collecting a transmission status of each of the communication networks;

analyzing transmission characteristics of a predetermined number of packets of a service flow to determine a traffic pattern type of the service flow; and comparing the transmission status of each of the communication networks with transmission requirements of the traffic pattern type of the service flow to select one of the network interfaces, and using the selected network interface to transmit packets of the service flow, wherein the service flow is constituted by packets transmitted by the network interfaces through a port and packets received by the network interfaces through the port.

12. The selection method for transmitting network packets of claim 11, wherein the transmission status of each said communication network comprises at least one of an available bandwidth, an end-to-end delay, an end-to-end delay jitter, a packet loss rate, and a packet error rate of the communication network.

13. The selection method for transmitting network packets of claim 11, wherein the step of collecting the transmission status of each of the communication networks comprises:

for each of the communication networks, computing the transmission status of the communication network or obtaining the transmission status of the communication network from an access point or a base station of the communication network.

14. The selection method for transmitting network packets of claim 11, wherein the transmission characteristics comprise a size, a timestamp and a transmission direction of the corresponding packet, and the transmission direction including transmitting or receiving.

15. The selection method for transmitting network packets of claim 14, wherein the step of determining the traffic pattern type of the service flow comprises:

calculating a plurality of time differences according to the transmission direction and the timestamp of each of the predetermined number of packets; and determining the traffic pattern type of the service flow according to the transmission direction, the size, and the time differences of each of the predetermined number of packets.

16. The selection method for transmitting network packets of claim 11, wherein the step of determining the traffic pattern type of the service flow comprises:

according to the transmission characteristics of each packet among the predetermined number of packets, relating each said packet to at least one traffic pattern type among a plurality of traffic pattern types; and determining the traffic pattern type of the service flow according to a packet amount of each of the plurality of traffic pattern types.

17. The selection method for transmitting network packets of claim 16, wherein the step of determining the traffic pattern type of the service flow according to the packet amounts comprises:

if a proportion of the packet amount of a specific traffic pattern type among the plurality of traffic pattern types is greater than or equal to a preset value, setting the traffic pattern type of the service flow to the specific traffic pattern type; and if the proportion of the packet amount of each of the plurality of traffic pattern types is less than the preset value, setting the traffic pattern type of the service flow to a preset traffic pattern type among the plurality of traffic pattern types.

18. The selection method for transmitting network packets of claim 11, further comprising:

when a packet is to be transmitted, using a source port of the packet as an index, and searching for a routing rule matching the index in a routing rule table; and if the routing rule is in the routing rule table, transmitting the packet according to the routing rule, wherein the routing rule specifies using one of the network interfaces to transmit the packet.

19. The selection method for transmitting network packets of claim 18, further comprising:

if the routing rule is not in the routing rule table, determining that the packet belongs to a new service flow;

selecting one of the network interfaces according to the transmission status of each of the communication networks and the traffic pattern type of the new service flow;

establishing the routing rule matching the index for the new service flow; and transmitting packets of the new service flow according to the routing rule, wherein the routing rule specifies using the network interface selected for the new service flow to transmit packets of the new service flow.

20. The selection method for transmitting network packets of claim 19, further comprising:

periodically re-determining the traffic pattern type of the new service flow, and selecting one of the network interfaces according to the transmission status of each of the communication networks and the traffic pattern type of the new service flow, thereby updating the routing rule.

* * * * *